Aug. 25, 1959 W. M. BARRET ET AL 2,901,689
METHOD OF EXPLORING THE EARTH WITH ELECTROMAGNETIC ENERGY
Filed Jan. 23, 1957 4 Sheets-Sheet 1

Inventors
William M. Barret
Glenn J. Baker
By
Attorney

Inventors
William M. Barret
Glenn J. Baker

By

Attorney

Inventors
William M. Barret
Glenn J. Baker
By
Attorney

2,901,689

METHOD OF EXPLORING THE EARTH WITH ELECTROMAGNETIC ENERGY

William M. Barret and Glenn J. Baker, Shreveport, La., assignors to Engineering Research Corporation, Shreveport, La., a corporation of Louisiana Application January 23, 1957, Serial No. 635,763

10 Claims. (Cl. 324—6)

This invention relates to the art of electrical prospecting, and provides an improvement in methods of propagating electromagnetic energy into the earth.

The instant application is a continuation in part of applicants' earlier filed applications, Serial No. 472,976, filed January 20, 1943, now abandoned, Serial No. 71,508, filed January 18, 1949, and Serial No. 354,680, filed May 13, 1953, for "Method of Transmitting Electromagnetic Waves Into the Earth."

In the early nineteen-thirties experiments were undertaken by a number of investigators in an effort to learn if radio waves could be utilized effectively in exploring the earth in search of mineral deposits.

The results of these experiments showed that the amount of electrical energy that could be transmitted into the earth and reflected therefrom by mineral deposits was too small for reliable detection when the depths of the deposits exceeded a few hundred feet. This very limited depth range was inadequate to meet practical requirements, and accordingly the radio methods of exploration soon were regarded as having little or no practical utility.

This conclusion was corroborated in unmistakable language in the three most recent textbooks on geophysical exploration, all of which were published in 1940. These textbooks are: "Geophysical Exploration," C. A. Heiland, Prentice-Hall, Inc., New York; "Exploration Geophysics," J. J. Jakosky, Times-Mirror Press, Los Angeles; "Geophysical Prospecting for Oil," L. L. Nettleton, McGraw-Hill Book Company, Inc., New York.

After many years of costly and laborious research, applicants learned that one of the basic causes for the failure of the radio methods was due to the fact that the surface of the earth is such a good reflector of radio waves that but a small part of the wave energy that left the transmitter actually entered the earth.

Applicants found that the amount of energy entering the earth seemed to vary in some manner with the frequency of the wave energy. It also seemed to vary with the angle at which waves impinged on the earth, that is, with the angle of incidence of the waves on the earth's surface. They finally determined that optimum results in a particular locality were obtained by a critical and mutual adjustment of both frequency and angle of incidence. The problem appeared to be solved until the same mutual adjustment was tried in a different locality, with unsuccessful results.

In addition to frequency and angle of incidence, applicants concluded that there evidently was at least one unknown variable involved in the operation. It developed that the unknown quantity was the electrical character of the ground itself, which was found by experiments to vary from place to place. It also was found that the electrical character of the ground varied with the frequency and with the angle of incidence. The problem was further complicated by the fact that the electrical character of the ground is highly complex, in that it comprises three different properties, namely: magnetic permeability, electrical conductivity and dielectric constant; the last two quantities varying in a complicated manner with the frequency, and to a lesser degree, with the angle of incidence. Applicants learned that perhaps the best criterion for studying the electrical character of the ground was its "refractive index," a quantity whose value is determined by the above-designated three properties and by the frequency.

With so many variables entering into the problem, it seemed difficult indeed to develop a simple and straightforward mechanism or technique that would be both effective and practical. This, however, was finally accomplished.

Applicants' improved method is based on a predetermined mutual adjustment of the angle of incidence of the waves and of their frequency as a function of the electrical properties of the ground. The method makes it possible in any given locality to transmit large amounts of electromagnetic energy into the earth. It provides predetermined and optimum values of frequency and angle of incidence for maximum transmission, based on measured values of the electrical properties of the ground, or on values that are determined from previous experience. The method further provides, for various types of ground, predetermined and exact values of the angle of incidence for maintaining constant transmission at various frequencies, which is a matter of great concern in the operation of certain variable-frequency methods of radio exploration.

Optimum conditions for transmitting electromagnetic energy into the earth can be determined either by taking into consideration electrical parameters of the earth or by a complicated and inefficient cut-and-try process. Since no method of determining the optimum transmission of electromagnetic waves into the earth has been found in the prior art, geophysical investigators either find optimum transmission conditions accidentally, or haphazardly by a cut-and-try process, since the optimum conditions are influenced by a number of quantities, the values of which are not known, or they have ignored them altogether. As far as is known, optimum conditions for transmission of electromagnetic energy across a boundary have not heretofore been considered in the development of geophysical methods. For example, the geophysical method described by G. Potapenko in U.S. Patent No. 2,139,460, and the method described by R. W. Deardorff in U.S. Patent No. 1,838,371, are both obviously influenced to a considerable degree by the varying efficency of transmission across the air-earth interface, yet it was entirely ignored by both inventors. No mention was made by either patentee of the aforementioned electrical parameters of the earth, nor was any mention made by either patentee of a cut-and-try method of obtaining optimum transmission conditions, which would have necessitated moving both the transmitter and receiver, together with the proper adjustment of the angle of incidence, in order to investigate a particular subsurface location, all the while considering the variation in attenuation and electrical properties at the various locations.

Performance of applicants' method does not involve a cut-and-try procedure. On the contrary, it may be defined in exact mathematical terms.

By notably improving the transmission of radio waves into the earth, the method represents an important contribution to the art of electrical exploration. Evidence of this is the fact that applicants now find it possible to transmit radio waves thousands of feet into the earth, and thereby reveal valuable mineral deposits hidden therein.

It is, accordingly, one of the objects of the herein described invention to provide a novel and useful method of minimizing the reflection loss that ordinarly occurs at the earth's surface.

Another object of the invention is to furnish a reliable and effective technique of transmitting electromagnetic energy past the air-earth boundary and into the earth. The receiving means disclosed in applicant Barret's copending application Serial No. 584,960, filed March 26, 1945, is particularly adapted to detecting the said energy after its return from depth in the earth, or alternatively, conventional types of receiving means are available for detecting the returned energy after its reflection by and refraction at various lithologic boundaries, or its "reradiation" by buried geologic masses identified by anomalous electrical properties. This aspect of the problem will, therefore, receive no further consideration herein.

A further object of the invention is to disclose a practical and convenient method of transmitting a substantially uniform amount of electrical energy across the air-earth boundary at various frequencies.

Other objects of the invention will be evident from a study of the description which follows, and the drawings appended thereto, wherein.

Figure 1:
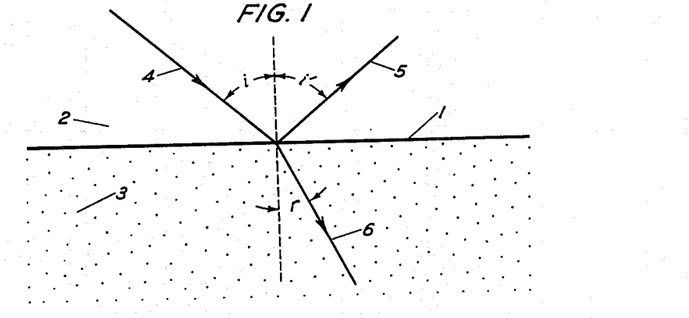
Fig. 1 illustrates diagrammatically the reflection and refraction of a radio wave incident on a boundary between air and earth.

When a radio wave impinges on a boundary separating media having different indices of refraction, as for example the boundary 1 between the air 2 and earth 3 (Fig. 1), a part 5 of the incident energy 4 is reflected and a part 6 is refracted. The angle of incidence $i$ is equal to the angle of reflection $i'$, and the angles of incidence and refraction are related, according to Snell's law, as $$\frac{\sin i}{\sin r} = n \qquad (1)$$

where $r$ is the angle of refraction and $n$ is the index of refraction of the earth with respect to air. For the partially conducting media that constitute the earth, the refractive index is given by $$n = \sqrt{\frac{1}{2}\left[\mu\epsilon + \sin^2 i + \sqrt{\left(\frac{2\mu\sigma}{f}\right)^2 + (\mu\epsilon - \sin^2 i)^2}\right]} \qquad (2)$$

where $\mu$ is the magnetic permeability in electromagnetic units, $\epsilon$ and $\sigma$ are respectively the dielectric constant and conductivity in electrostatic units, and $f$ is the frequency in cycles per second.

It is evident, therefore, that when a radio wave strikes an interface which separates media having different values of $n$, there is a component of the wave that is reflected and a component that is transmitted. The reflection coefficient, $R$, is the ratio of the intensities (amplitudes squared) of the reflected and incident waves, and the transmission coefficient, $T$, is equal to $1-R$. The reflection coefficient for a wave having its electric vector perpendicular to the plane of incidence (herein denoted "horizontal polarization") is expressed by $$R_1 = \frac{(q - \mu \cos i)^2 + p^2}{(q + \mu \cos i)^2 + p^2} \qquad (3)$$

where $$q = \sqrt{\frac{1}{2}\left[\mu\epsilon - \sin^2 i + \sqrt{\left(\frac{2\mu\sigma}{f}\right)^2 + (\mu\epsilon - \sin^2 i)^2}\right]} \qquad (4)$$

and $$p = \sqrt{\frac{1}{2}\left[\sin^2 i - \mu\epsilon + \sqrt{\left(\frac{2\mu\sigma}{f}\right)^2 + (\mu\epsilon - \sin^2 i)^2}\right]} \qquad (5)$$

When the incident wave has its electric vector parallel to the plane of incidence (herein denoted "vertical polarization"), the reflection coefficient is $$R_{11} = \frac{(\epsilon \cos i - q)^2 + \left(\frac{2\sigma}{f} \cos i - p\right)^2}{(\epsilon \cos i + q)^2 + \left(\frac{2\sigma}{f} \cos i + p\right)^2} \qquad (6)$$

Figure 2:
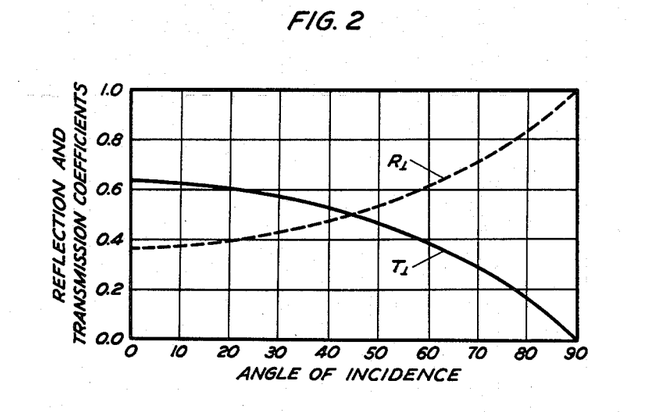
Fig. 2 displays graphs that show the relation between the reflection and transmission coefficients and the angle of incidence for a horizontally polarized wave having a frequency of 2 megacycles and incident on a boundary between air and earth having the electrical properties: $\mu=1$ emu., $\epsilon=4$ esu., $\sigma=10^7$ esu., where $\mu$, $\epsilon$ and $\sigma$ are respectively the magnetic permeability, dielectric constant and conductivity of the said earth.
Figure 3:
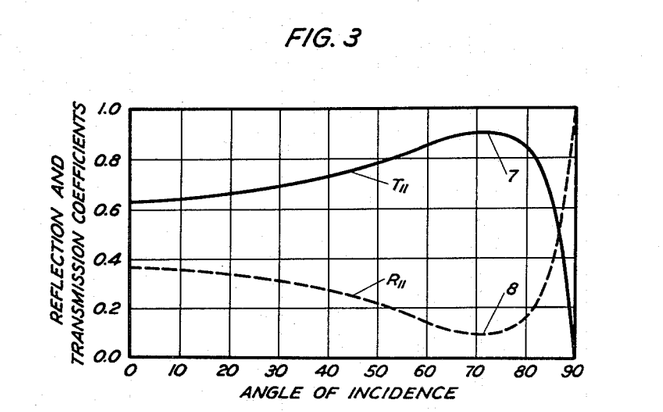
Fig. 3 exhibits graphs that indicate the variation with angle of incidence of the reflection and transmission coefficients for a vertically polarized wave whose frequency is 2 megacycles and which is incident on the same air-earth boundary considered in Fig. 2.

In Fig. 2 are shown curves which display the variation with angle of incidence of the reflection and transmission coefficients for a horizontally polarized wave having a frequency of $2 \times 10^6$ cycles per second (2 megacycles), incident on a boundary between air and earth having the electrical properties: $\mu=1$ emu., $\epsilon=4$ esu. and $\sigma=10^7$ esu. Fig. 3 illustrates the relations that exist for a vertically polarized wave of the same frequency, and incident on the same boundary.

The curves of Fig. 2 show that, for a horizontally polarized wave, maximum transmission across the boundary occurs when the angle of incidence is zero degrees (normal incidence); that $T_1$ is zero and $R_1$ is 1 when $i$ is 90 degrees (grazing incidence), and that under optimum conditions but little more than 60 percent of the incident energy can be transmitted past the air-earth interface. For a vertically polarized wave, it is seen from Fig. 3 that the curves display the maximum and minimum points 7 and 8, which correspond to an angle of incidence of about 72 degrees, and that some 92 percent of the incident energy is transmitted past the air-earth boundary for this angle of incidence.

Substantially the same relations hold for earth having electrical properties different from those assumed in constructing the curves of Figs. 2 and 3. As the refractive index increases, due to an increase in the permeability, dielectric constant or conductivity, or to a decrease in the frequency, the maximum and minimum points 7 and 8 of Fig. 3 move together in the direction of grazing incidence; the value of the point 7 decreases, and that of the point 8 increases. Lowering the value of $n$ moves the said points toward normal incidence, increases the value of the point 7, and decreases that of the point 8. The value of the transmission coefficient at the maximum point 7 in Fig. 3 is 46 percent greater than at normal incidence. This represents but a nominal increase in transmission, owing to the comparatively low refractive index of the earth concerned. However, for highly conducting earth, having a correspondingly large index of refraction at the frequency considered, the transmission coefficient may have a maximum value several hundred percent above its value at normal incidence. The utility of the herein described invention accordingly increases as the refractive index of the geologic medium (or media) involved becomes larger.

Figure 4:
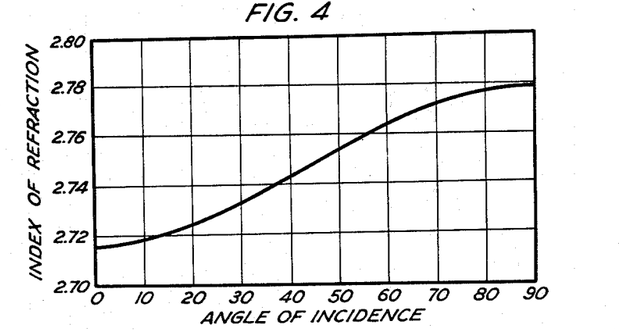
Fig. 4 shows the functional relation between the index of refraction and the angle of incidence for a vertically polarized wave of 2 megacycles incident on the same air-earth boundary considered in Fig. 2.

The refractive index is influenced but slightly by the permeability, since $\mu$, for the surface and near-surface earth materials encountered in practice, ordinarily may be considered unity at radio frequencies. Furthermore, under most practical conditions, large changes in the angle of incidence cause but small variations in the refractive index, as will be noted in Fig. 4, where the frequency and electrical properties of the earth are the same as those assumed for Figs. 2 and 3. It is, therefore, the dielectric constant and conductivity of the earth, and the frequency of the incident radiation, that chiefly determine the value of the refractive index. For comparatively low radio frequencies the conductivity is the controlling factor, but as the frequency increases the earth behaves more and more like a dielectric, and consequently, the dielectric constant assumes progressively greater importance.

If the earth be regarded as a dielectric for a particular frequency spectrum, and be considered to have zero conductivity, then $n=\sqrt{\mu\epsilon}$, and the $i$ versus $R_{11}$ and $i$ versus $T_{11}$ curves remain similar to those illustrated in Fig. 3 for a partially conducting medium, but in this case all of the incident energy is transmitted across the air-earth boundary at the maximum and minimum points of the curves, and as before, an increase in the refractive index moves the said points toward grazing incidence, and vice versa. For a perfect dielectric ($\sigma=0$), it is noted that $n$ is independent of frequency and angle of incidence.

It is only the energy that is transmitted into the earth that can prove effective in the operation of any radio-wave method of prospecting, and to accomplish maximum transmission it is seen that vertically polarized waves must be employed, and that the waves must be directed into the earth at a particular angle of incidence which is determined by the frequency of the waves and the electrical properties of the earth.

It has not been unusual for radio-prospecting techniques to make use of vertically polarized waves, but applicants can find no reference in the art or literature suggesting that the waves have been directed into the earth at a particular angle in order to avoid the excessive reflection loss that characterizes the conventional radiating systems. It will be understood that the said conventional radiating systems ordinarily embody either a horizontal or vertical non-directional antenna which is placed in the air, a substantial distance above the earth's surface. Each current element distributed along the length of such an antenna radiates waves in many directions, with the result that the waves arrive at the air-earth interface at practically all angles of incidence between zero and 90 degrees. Obviously, under such conditions, the transmission of waves into the earth is very ineffective.

In the preferred method of practicing the instant invention, the reflection loss at the ground surface is reduced to a minimum by employing vertically polarized waves which are directed into the earth at the most effective angle of incidence.

The particular angle of incidence that results in maximum transmission across an air-earth boundary for a given frequency will be designated the "optimum angle," and it may be found by differentiating Equation 6 with respect to $i$ and equating the derivative to zero, since the reflection coefficient $R_{11}$ has its minimum value at the optimum angle. Neglecting the magnetic permeability, it can be shown that the optimum angle, $\theta$, is the angle that satisfies the equation $$\left(\epsilon^2+\frac{4\sigma^2}{f^2}\right)\cos^2\theta-\sin^2\theta=\sqrt{\left(\frac{2\sigma}{f}\right)^2+(\epsilon-\sin^2\theta)^2} \quad (7)$$

The solution of Equation 7 for $\theta$, even with numerical values for $f$, $\epsilon$ and $\sigma$, is tedious, and it is preferable therefore to have a more convenient and direct means for computing $\theta$ when the frequency and electrical properties of the earth are known. A simpler expression, and one that gives substantially the same results, can be developed from the fact that when the incident waves strike the air-earth interface at the optimum angle, the phase change in the reflected beam is very approximately 90 degrees. This relation leads to the following equation:

$$\cos^2\theta=\frac{\epsilon-1+\sqrt{\left(\epsilon^2+\frac{4\sigma^2}{f^2}\right)^2\left[\left(\frac{2\sigma}{f}\right)^2+(\epsilon-1)^2\right]}-\left(\frac{2\sigma}{f}\right)^2}{\left(\epsilon^2+\frac{4\sigma^2}{f^2}\right)^2-1} \quad (8)$$

Figure 5:
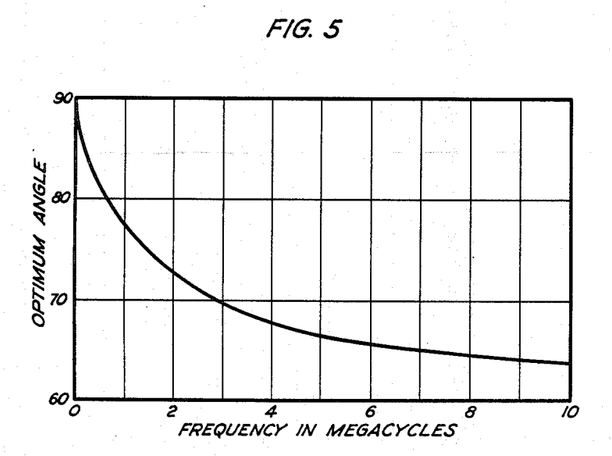
Fig. 5 presents a curve that illustrates graphically the variation of the optimum angle of incidence for maximum transmission of vertically polarized waves into the earth with the frequency of the said waves, when the radiation is incident on the same air-earth boundary considered in Fig. 2.

Equation 8 shows that the optimum angle $\theta$, which is the angle of incidence for maximum transmission into the earth, is determined by $f$, $\epsilon$ and $\sigma$. In Fig. 5 is illustrated a curve that expresses graphically the relation defined by Equation 8 between the frequency of a vertically polarized wave and the optimum angle, for earth having the same electrical properties used in preparing Figs. 2, 3 and 4. It will be understood that a family of curves of this type, covering various combinations of dielectric constant and conductivity, will prove helpful and convenient in applying the invention after the frequency is selected.

The most effective frequency to be used in a particular case may be found by the method hereinafter set forth, and the dielectric constant and conductivity of a given earth material may be determined in a number of ways, for example, by the field procedures described by A. Hund in his book: "High-Frequency Measurements," pp. 290–297, McGraw-Hill Book Co., Inc., New York (1933), or in accordance with the laboratory method discussed by R. L. Smith-Rose in his paper: "The Electrical Properties of Soil for Alternating Currents at Radio Frequencies," which appeared in the Proceedings of the Royal Society, A, cxl, pp. 359–377 (1933), a copy of which may be obtained from the Engineering Societies Library, New York.

From what has gone before it will be evident that with some kinds of earth, and for certain frequency ranges, both the dielectric constant and the conductivity play an important part in determining the optimum angle, but that with other types of earth, and/or for other frequency bands, either the dielectric constant or the conductivity may have the predominant effect. Moreover, under exceptional conditions, the surface and near-surface geologic media may carry a sufficient concentration of disseminated ferruginous material for the permeability to influence appreciably the refractive index of the said media, and consequently, the said optimum angle. When this occurs, the permability should be taken into account in computing the refractive index used in determining the optimum angle. Employing essentially the same technique described in applicant Barret's paper entitled "Semi-portable Alternating-Current Susceptibility Meter," which appeared in Physics, pp. 149–154, vol. 3, No. 3, September 1932 (American Institute of Physics, Inc., New York), the permeability of a particular geologic medium may be measured at various frequencies by determining the inductance of a coil with and without a core of the said medium. It will be understood, then, that the dielectric constant, conductivity and permeability, or combinations thereof, may influence the operation of the herein disclosed invention, so for the sake of simplicity, and to remove any ambiguity, the electrical property or properties that govern the optimum angle for a given earth and frequency will henceforth at times be termed the "significant" electrical properties of the said earth.

In the practical application of the invention it is fortunate that, when the frequency remains unchanged, the variations ordinarily observed in the significant electrical properties of the surficial media from place to place in the same general area are not very large, for this condition simplifies the manipulative procedure, regardless of which of the herein described modes of operation is employed.

However, it should be pointed out here that many kinds of earth media are characterized by anomalous dispersion, and therefore the electrical properties of the same media may vary over considerable ranges as the frequency is changed. The variation with frequency of the electrical properties, particularly the dielectric constant and conductivity (and hence the refractive index), is of sufficient magnitude to emphasize the desirability of determining the values of the said properties at or near the operating frequency.

Figure 6:
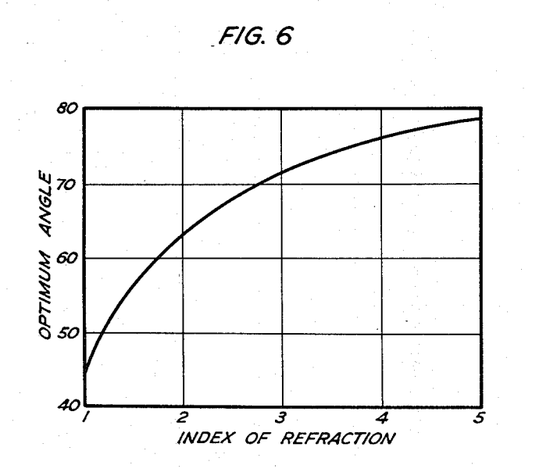
Fig. 6 displays a graph that shows how the optimum angle of incidence for maximum transmission of vertically polarized waves into the earth varies with the index of refraction of the said earth.

There is an alternative method of finding the optimum angle which does not require the individual measurement of the several electrical properties of the earth medium concerned. With this method the optimum angle is found directly from its functional relation to the refractive index of the said medium. The refractive index may be determined by the technique disclosed in applicant Barret's U.S. Patent No. 2,426,918, issued September 2, 1947, under the title "Method for Electromagnetic-Wave Investigations of Earth Formations," or the refractive index may be determined in various other ways, for example, by finding for a given frequency the wave length in the said medium, and then dividing the wave length thus found into the corresponding free-space wave length to get the refractive index. The wave length in the medium may be found with sufficient accuracy by determining the electrical length of an antenna, which is placed on or within the medium and driven at the required frequency, in accordance with the methods described by A. Hund in his treatise entitled "High-Frequency Measurements," p. 391, McGraw-Hill Book Co., Inc., New York (1933). In the absence of a method of measuring the refractive index, it will be understood that $n$ may be determined for a given frequency from Equation 2 after values are found for $\epsilon$ and $\sigma$ as already explained. Knowing the refractive index, it can be shown that, within a fairly close degree of approximation, $$\theta = \tan^{-1} n \qquad (9)$$

where $n$ is the index of refraction of the surficial geologic medium under consideration at the operating frequency. A plot of Equation 9 appears in Fig. 6, for values of $n$ between 1 and 5.

Figure 9:
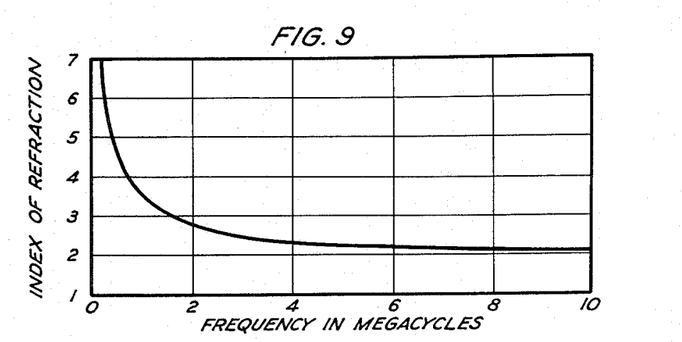
Fig. 9 displays a graph that illustrates the relation between the frequency and the refractive index when a vertically polarized wave is incident at an angle of 70 degrees on the same earth considered in Fig. 2.

Alternatively, for a selected angle of incidence the optimum frequency may be found by choosing the frequency that makes the refractive index substantially equal to the tangent of the angle of incidence. In applying this technique, the relation between frequency and refractive index is first determined by measurement or calculation, as hereinabove described. This relation, which is practically independent of the angle of incidence, is shown graphically in Fig. 9 for earth of the electrical character considered herein. Now suppose that the selected angle of incidence is 70 degrees. The tangent of 70 degrees is 2.75, and therefore the optimum frequency is seen to be 2 megacycles from Fig. 9. Thus for an angle of incidence of 70 degrees, maximum transmission into the type earth considered would be obtained with an operating frequency of 2 megacycles.

The preferred method of operation is based on the use of the refractive index, rather than the significant electrical properties, because of the comparative ease with which the refractive index may be measured in actual field practice. Furthermore, the refractive index generally varies but little from one locality to another adjacent locality, and hence its value may frequently be determined from previous experience.

To apply the invention in practice it is necessary, after finding the optimum angle of incidence, to have a means for directing electromagnetic waves onto the ground surface at the said optimum angle. There are numerous directional-antenna systems disclosed in the radio art and literature which are suitable for directing vertically polarized electromagnetic radiation onto the air-earth interface at any required angle. Such directional systems are well known to those versed in the radio art, for their theory, design and construction have been described in detail in a number of publications. For a brief and practical treatment of the subject, reference is made to the "Antenna Book," published by the American Radio Relay League, Inc., of West Hartford, Connecticut (1942).

It will be found that unidirectional "beam" transmission of electromagnetic waves can be obtained from combinations of coil antennas, multielement directive arrays, and with other forms of antenna systems. The subject requires no further discussion here, other than to state that the antenna structure preferably is arranged for partial rotation in the plane of incidence, so that the angle of incidence of the waves at the air-earth interface may be varied to meet operating conditions, and to point out that the radiators, reflectors and/or directors embodied in the antenna structure should be far enough removed from the said interface to keep the radiation resistance of the antenna system sufficiently high for effective wave propagation, and for efficient loading of the associated transmitter.

The angle of incidence of the propagated waves with the air-earth boundary may, of course, be varied in ways other than by a mechanical rotation of the directional-antenna structure. For example, when "parasitic" reflectors and/or directors are used, the number, dimensions and spacing of the antenna elements provide means for changing the direction of maximum wave propagation. When "driven" reflectors and/or directors are employed, then varying the relative phase of the currents supplied the antenna elements furnishes an additional means for altering the direction in which the antenna "fires." Henceforth in this specification, when reference is made to varying the angle of incidence of the waves propagated by a directional-antenna structure by a partial rotation of the said structure in the plane of incidence, it is to be understood that various methods, including those set forth in this paragraph, are to be considered alternative techniques that at times may be utilized instead of the said partial rotation.

In those cases where conditions indicate the advantageous use of comparatively long waves, it may sometimes be found difficult in practice to obtain a very effective directional-antenna structure that may be rotated even partially in the plane of incidence, owing to the relatively large size of the said structure. Unless the physical size of the antenna structure can be reduced to suitable dimensions by the insertion of loading coils in its resonant elements, then it may be preferable to use a fixed directional-antenna structure, which propagates waves at a suitably large and substantially constant angle of incidence, and to vary the frequency in order to make the optimum angle conform to the angle of incidence of the waves propagated by the said fixed directional-antenna structure. It is to be understood that the use of loading coils is not restricted to the antenna structure here referred to, for such coils may oftentimes be employed to advantage with various other directional-antenna structures considered herein, with the result that an otherwise bulky antenna structure may be so reduced in size that it is suitable for portable field operations.

Before considering the preferred method of operating the invention at fixed angles of incidence, it is well to look further into the relation between frequency and angle of incidence, and to see how variations in frequency influence the behavior of the invention when it functions: (a) at fixed frequency and variable angle of incidence, and (b) at fixed angle of incidence and variable frequency.

As the frequency of the incident radiation increases, Equation 2 shows that the refractive index decreases for a given earth and for a given angle of incidence. This relation has a distinct bearing on the mode of operation set forth under (a) above, for the value of the transmission coefficient $T_{11}$, at its maximum point 7 in Fig. 3, increases with frequency and approaches its limiting value of 1 when $n=\sqrt{\mu\epsilon}$.

Figure 7:
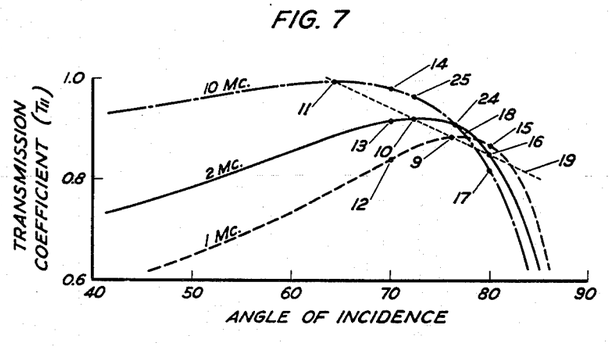
Fig. 7 illustrates portions of three curves that indicate the variation with angle of incidence of the transmission coefficient for vertically polarized waves whose frequencies are 1, 2 and 10 megacycles and which are incident on the same air-earth boundary considered in Fig. 2.

This point will be clarified by reference to Fig. 7, where portions of three $i$ versus $T_{11}$ curves are illustrated for frequencies of 1, 2 and 10 megacycles and for earth having the electrical properties used previously herein. It will be seen that for each frequency there is an optimum angle of incidence that corresponds to maximum transmission at the said frequency, and that the value of the transmission coefficient, at the optimum angle, increases as the frequency is raised. These conditions hold when the invention is operated at a fixed frequency, and the optimum angle of incidence (such as the point 9, 10 or 11 of Fig. 7) varies in accordance with Equation 8.

Consider next the functioning of the invention at a fixed angle of incidence and at a frequency that is determined by the electrical properties of the earth involved. The curves shown in Fig. 8 express graphically the relation between $i$ and $T_{11}$ for fixed angles of incidence of 70, 75, 80 and 85 degrees, and for earth having the values previously specified for $\mu$, $\epsilon$ and $\sigma$. Each of these curves was obtained by substituting for $i$ in Equation 6 the respective fixed angle of incidence, and computing $R_{11}$ for various frequencies between 0 and 10 megacycles. The transmission coefficient then was found from the relation: $T_{11}=1-R_{11}$.

Figure 8:
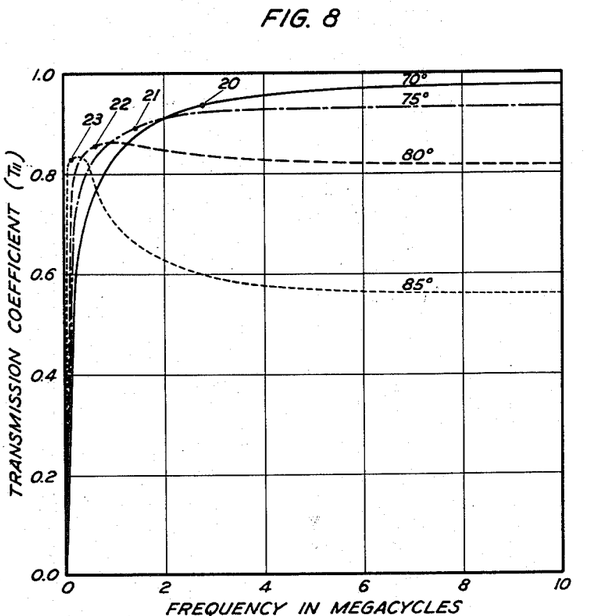
Fig. 8 shows graphically the relation between the transmission coefficient and the frequency of a vertically polarized wave incident on the same air-earth boundary considered in Fig. 2 at fixed angles of incidence of 70, 75, 80 and 85 degrees.

The graphs of Fig. 8 illustrate, among other things, that $T_{11}$ rises sharply with $f$ for comparatively low values of frequency; that maxima in $T_{11}$ occur for the 80-degree and 85-degree curves at 0.61 and 0.15 megacycle respectively; that the 75-degree curve becomes substantially parallel to the frequency axis when $T_{11}$ reaches a value of some 93 percent; that the maximum value of $T_{11}$ for the 70-degree curve lies above 10 megacycles; that the smaller the angle of incidence the higher must be the frequency to obtain maximum transmission, and vice versa; and finally, that the maximum amount of energy that can be transmitted past the air-earth interface becomes greater as the angle of incidence is decreased, and the frequency is correspondingly increased, provided $\theta$ is not made less than $\tan^{-1}\sqrt{\mu\epsilon}$.

A better understanding of these conditions will be had if an examination be made of the mutual relations that exist between the curves of Fig. 8 and those of Fig. 7. For example, consider in the latter figure the point 12, which indicates the value of $T_{11}$ when the angle of incidence is 70 degrees and the frequency is 1 megacycle. For this angle of incidence it will be seen that $T_{11}$ may be increased to the point 13 by raising the frequency to 2 megacycles, and that $T_{11}$ may be further increased to the point 14 by making the frequency 10 megacycles. This is in accordance with what is shown by the 70-degree graph of Fig. 8. However, for an angle of incidence of 80 degrees in Fig. 7, it will be noted that increasing the frequency from 1 to 2 megacycles causes $T_{11}$ to fall from the point 15 to the point 16, and another increase in frequency to 10 megacycles results in a further decline in $T_{11}$ to the point 17. This is also in agreement with what is shown by the 80-degree curve of Fig. 8.

The curves under discussion indicate, therefore, that for certain angles of incidence the energy transmission increases with frequency, but that for higher angles of incidence the transmission becomes less as the frequency is raised. It is evident that the dividing line occurs in the neighborhood of the point 18 of Fig. 7, which is substantially common to the three $i$ versus $T_{11}$ curves there illustrated. For angles of incidence less than that represented substantially by the said point 18, the transmission increases with the frequency, but for greater angles the transmission bears an inverse relation to the frequency. The straight dotted line 19, which joins the respective optimum angles (and $T_{11}$ maxima), represents substantially the curve of Fig. 5 when the said angles are plotted against their respective frequencies.

When an antenna structure is employed that radiates waves at a fixed angle of incidence with respect to the earth's surface, the "corresponding" frequency may be found by rearranging Equation 8 as follows:

$$f=\frac{2.828\sigma\cos^2\theta}{\sqrt{1-2\epsilon^2\cos^4\theta}+\sqrt{1-4\sin^2\theta\cos^4\theta(2\epsilon-\sin^2\theta)}}$$

(10)

where $\theta$ is the same fixed angle of incidence, or the frequency may be read directly from a graph similar to that shown in Fig. 5.

Evaluating Equation 10 for the "optimum" frequency for the conditions assumed in Fig. 8 gives the respective frequencies indicated by the points 20, 21, 22 and 23. It is observed that these points are in each case lower than the frequency which leads to the greatest possible transmission for the given angle of incidence. The reason for this will be apparent from a consideration of Fig. 7, where it is seen that $T_{11}$ has a lower value at the 1 megacycle maximum 9 than it does at point 24, which falls at the same angle of incidence on the 2-megacycle curve, and that the value of $T_{11}$ is less at the 2-megacycle maximum 10 than it is at the point 25, which represents the same angle of incidence but an increase in frequency to 10 megacycles.

It will be found that increasing the respective frequencies to conform precisely to the values indicated by the various curves of Fig. 8 adds but little to the energy transferred across the air-earth boundary, and too, the increase in frequency generally would increase the absorption losses suffered by the waves after entering the partially conducting earth, as shown by Haas: "Introduction to Theoretical Physics," vol. 1, p. 291, Constable and Co., London (1933).

The herein invention is, of course, concerned primarily with the problem of transmitting wave energy past the interface between air and earth with minimum reflection loss, but it should be kept in mind that after a wave enters the earth and travels therein its amplitude is progressively attenuated, due to thermal losses associated with the conduction currents initiated by the said wave, and that the attenuation is related to the frequency of the wave in question. The dependence of attenuation on frequency, and a method of minimizing the said attenuation, is disclosed in the aforesaid Patent No. 2,426,918.

For present purposes it may be said that, in general, the attenuation increases as the frequency is raised, and hence in practicing the invention it is usually preferable to use the lowest frequency consistent with effective transmission across the air-earth interface. In view of the fact that the points 20, 21, 22 and 23 (Fig. 8) represent about the lowest frequencies at which substantially all of the incident energy is transmitted past the said interface for the respective angles of incidence considered, it follows that an evaluation of Equation 10 furnishes the substantially optimum frequency when the operation of the invention is based on a fixed angle of incidence.

It is evident that the attenuation suffered by a wave in traveling through the earth increases with the length of the earth path, which in a practical sense is equivalent to saying that the attenuation increases with the depth of exploration. From this it follows that the preferred use of the lowest permissible frequency is especially desirable in the case of deep explorations. Generally speaking, the operable frequency range will rarely extend as high as 10 megacycles, and only in the case of shallow explorations involving dry geologic media will the range extend as high as some 25 megacycles. In this connection it is also worth noting that in ordinary practice the angle of incidence will never be less than about 50 degrees and it will never exceed 90 degrees.

Summing up the foregoing discussion concerning the distinction between the operation of the invention at fixed frequency and variable angle of incidence, and at fixed angle of incidence and variable frequency, it will be understood that for any selected frequency the optimum angle of incidence may be determined from Equation 8, or from Equation 9 if $n$ were known for the said selected frequency, and that for any selected angle of incidence the substantially optimum frequency may be found from Equation 10, provided the solution leads to a real and positive value for the said frequency, or it may be found by choosing the frequency that makes the refractive index of the earth medium involved substantially equal to the tangent of the selected angle of incidence. Alternatively, the said optimum angle of incidence and the said optimum frequency may be read directly from a curve of the type shown in Fig. 5, which takes into account the electrical properties of the earth in question.

Another mode of operating the invention is based on a combination of the two methods referred to in the preceding paragraph. This procedure makes use of a directional-antenna structure whose direction of maximum propagation with respect to the earth's surface may be varied through a comparatively small angle in the plane of incidence, and which is capable of being excited over a fairly restricted frequency range. Very advantageous operation of the invention may be obtained if the permissible variation in angle of incidence and frequency be made adequate to satisfy the requirements imposed by the electrical properties of the earth involved.

There is still another mode of operation that may be utilized in practicing the invention; one which is particularly suited to applications that require the transmission coefficient to remain substantially constant while the frequency is varied. Such an application might arise in connection with a study of attenuation at different frequencies, or with the operation of certain variable-frequency prospecting systems. The alternative method here referred to employs, for the particular earth concerned, an angle of incidence corresponding to that represented by the point 18 of Fig. 7, and then makes use of any desired frequency whose $i$ versus $T_{11}$ curve passes substantially through said point. This technique provides, for a single fixed angle of incidence, substantially constant transmission across the air-earth boundary for a wide range of frequencies.

After the incident radiation has been introduced into the earth under the conditions set forth herein, it is oftentimes desirable to know the path taken by the waves in the said earth. The earth path, after leaving the air-earth boundary, is determined by the angle of refraction, $r$, which may be found from Equation 1 after the angle of incidence and the refractive index are known. When the operating procedure involves the determination of the significant electrical properties, rather than the index of refraction, it will be understood that the refractive index may be computed from Equation 2.

It is desired to emphasize that the scope of the herein disclosed invention is not limited to the transmission of electromagnetic energy past the boundary that separates air and earth, for the method described may be applied effectively in transmitting such energy past any boundary separating dielectric media, partially conducting media, or a combination thereof.

In describing the theory on which the herein disclosed methods are based, it has been assumed that the said methods involve the use of plane electromagnetic waves, whereas spherical waves generally are employed in practice. The assumption is believed justified, however, because of the simplification afforded by the plane-wave theory, and because the results actually obtained with the said methods agree within engineering tolerances with the theoretical expectations.

When practicing the various methods herein described and hereinafter claimed, it is to be understood that the performance of the said methods does not necessarily require the solution of one or more of the several equations that may relate to the said methods. Where the relations between the quantities involved in the said methods may be expressed in algebraic form, it is obvious that the same relations may be displayed by a family of curves or nomographs, or by tabulated data of similar character, so that any required quantity is immediately available from the said curves, or nomographs or tabulated data, once predetermined values have been assigned to the remaining quantities involved in the operation. In summary, the practice of the invention in the field involves the following major steps:

(a) First it is necessary to determine the approximate value of the refractive index, or alternatively, the approximate values of the other significant electrical parameters of the ground at the site of operations. Such determinations necessitate measurements in the field at the time of the investigation, or previous to that time. The refractive index, or the other electrical parameters, of the ground may be measured by means of techniques referred to in the several paragraphs following Equation 8.

(b) If the frequency has been previously selected, the optimum angle of incidence can be determined from Equation 8 or Equation 9, or if the angle of incidence has been previously selected, the optimum frequency may be found by application of Equation 10. Alternatively, suitable graphs or nomographs of the functions expressed in Equations 8, 9 and 10 may be employed in making the calculations.

(c) The antenna structure is set up to provide radiation in the direction indicated by the chosen or determined angle of incidence and transmission is initiated at the selected or determined frequency.

In the event the field investigation is one in which several frequencies are to be employed, graphs such as appear in Fig. 7 could be constructed after completion of step (a) above, and an angle of incidence chosen after inspection of the graphs, so that the transmitted energy would be nearly equal and nearly optimum for the range of frequencies to be employed.

It is to be understood that various modifications may be made in the methods hereinbefore disclosed, and in the apparatus referred to for carrying them out, without departing from the spirit or broad principle of the invention as defined in the following claims.

We claim:

1. In a method of transmitting vertically polarized electromagnetic waves into the earth, measuring in the field significant electrical properties of the surficial earth material at the location where said waves are to be introduced into said earth, utilizing the value of said significant electrical properties in determining the optimum angle of incidence corresponding to said significant electrical properties at a selected frequency, and then propagating said waves into the earth at substantially said optimum angle and at substantially said frequency.

2. In a method of transmitting vertically polarized electromagnetic waves into the earth, determining for a selected frequency the refractive index of the surficial earth material at the location where said waves are to be introduced into said earth, utilizing the determined value of said refractive index in finding the optimum angle of incidence corresponding to said determined value, and then propagating said waves into said earth at substantially said optimum angle and at substantially said frequency.

3. In a method of transmitting vertically polarized electromagnetic waves into the earth, directing said waves substantially along a wave path that intersects the earth's surface at a selected angle, measuring significant electrical properties of the surficial earth material at the location where said waves impinge on said earth's surface, utilizing the value of said significant electrical properties to determine the frequency which will make the optimum angle of incidence conform to the angle of incidence made by said wave path with said earth's surface, and adjusting the frequency of said waves substantially to the frequency corresponding to said optimum angle, whereby said waves are transmitted into said earth with minimum reflection loss.

4. In a method of transmitting vertically polarized electromagnetic waves into the earth, directing said waves substantially along a wave path that intersects the earth's surface at a selected angle, determining the refractive index of the surficial earth material at the location where said waves impinge on said earth's surface, utilizing the determined value of said refractive index to find the frequency which will make the optimum angle of incidence conform to the angle of incidence made by said wave path with said earth's surface, and adjusting the frequency of said waves to substantially equal the frequency corresponding to said optimum angle, whereby said waves are transmitted into said earth with minimum reflection loss.

5. In a method of transmitting into the earth vertically polarized electromagnetic waves of a frequency not exceeding 25 megacycles, determining the dielectric constant and conductivity of the surficial earth material at the location where said waves are to be introduced into the earth, and then transmitting said waves into said earth at said frequency and at an angle of incidence that lies between 50 degrees and 90 degrees and that corresponds substantially to that defined by $\theta$ in the following equation:

$$\theta = \cos^{-1} \sqrt{\frac{\epsilon - 1 + \sqrt{\left(\epsilon^2 + \frac{4\sigma^2}{f^2}\right)^2 \left[\left(\frac{2\sigma}{f}\right)^2 + (\epsilon-1)^2\right]} - \left(\frac{2\sigma}{f}\right)^2}{\left(\epsilon^2 + \frac{4\sigma^2}{f^2}\right)^2 - 1}}$$

wherein $\epsilon$ and $\sigma$ are respectively said determined values of the dielectric constant and conductivity in electrostatic units and $f$ is said frequency of said waves in cycles per second, whereby said waves are transmitted into said earth with minimum reflection loss.

6. In a method of transmitting into the earth vertically polarized electromagnetic waves of a frequency not exceeding 25 megacycles, determining for a particular frequency the refractive index of the surficial earth material at the location where said waves are to be introduced into the earth, utilizing the determined value of said refractive index in finding the angle of incidence that lies between 50 degrees and 90 degrees and that is substantially equal to the arc tangent of said determined value of said refractive index, and then transmitting said waves into said earth at said angle of incidence and at said frequency, whereby said waves are transmitted into said earth with minimum reflection loss.

7. In a method of transmitting vertically polarized electromagnetic waves into the earth at an angle of incidence lying between 50 degrees and 90 degrees, determining the dielectric constant and conductivity of the surficial earth material at the location where said waves are to be introduced into the earth, and then transmitting said waves into said earth at said angle of incidence at a frequency that does not exceed 25 megacycles and that corresponds substantially to that defined by $f$ in the following equation:

$$f = \frac{2.828\sigma \cos^2 \theta}{\sqrt{1 - 2\epsilon^2 \cos^4 \theta} + \sqrt{1 - 4 \sin^2 \theta \cos^4 \theta (2\epsilon - \sin^2 \theta)}}$$

wherein $\epsilon$ and $\sigma$ are respectively said determined values of the dielectric constant and conductivity of said earth in electrostatic units and $\theta$ is said angle of incidence, whereby said waves are transmitted into said earth with minimum reflection loss.

8. In a method of transmitting vertically polarized electromagnetic waves into the earth at a particular angle of incidence, determining at various frequencies the refractive index of the surficial earth material at the location where said waves are to be introduced, utilizing the determined values of said refractive index in selecting for said particular angle of incidence the particular frequency which makes the value of said refractive index substantially equal to the tangent of said particular angle of incidence, and then transmitting said waves into said earth at said particular angle of incidence and at said particular frequency said particular angle of incidence lying between 50 degrees and 90 degrees and said particular frequency not exceeding 25 megacycles, whereby said waves are transmitted into said earth with minimum reflection loss.

9. In a method of electrical prospecting, the technique of maintaining substantially constant the transmission of electromagnetic waves of different frequencies into earth of known electrical characteristics, comprising transmitting said waves of constant amplitude and of a selected frequency into said earth at a particular angle of incidence, said particular angle of incidence having a value corresponding to that defined by the substantially common intersection of the angle of incidence-transmission coefficient curves for said earth and said different frequencies, and said selected frequency having a value lying within the frequency range wherein said angle of incidence and said transmission coefficient are substantially independent of frequency.

10. In a method of electrical prospecting, the technique of maintaining substantially constant the transmission of electromagnetic waves of different frequencies into earth whose significant electrical properties are known, comprising transmitting said waves of constant amplitude and of a selected frequency into said earth at a particular angle of incidence, said particular angle of incidence having a value corresponding to that defined by the substantially common intersection of the $i$ versus $T_{11}$ curves for said earth and said different frequencies, where $i$ is the angle of incidence and $$T_{11} = 1 - \frac{(\epsilon \cos i - q)^2 + \left(\frac{2\sigma}{f} \cos i - p\right)^2}{(\epsilon \cos i + q)^2 + \left(\frac{2\sigma}{f} \cos i + p\right)^2}$$

wherein $\epsilon$ and $\sigma$ are respectively the dielectric constant and conductivity of said earth in electrostatic units $$q = \sqrt{\frac{1}{2}\left[\mu\epsilon - \sin^2 i + \sqrt{\left(\frac{2\mu\sigma}{f}\right)^2 + (\mu\epsilon - \sin^2 i)^2}\right]}$$

$$p = \sqrt{\frac{1}{2}\left[\sin^2 i - \mu\epsilon + \sqrt{\left(\frac{2\mu\sigma}{f}\right)^2 + (\mu\epsilon - \sin^2 i)^2}\right]}$$

$f$ is the frequency of said waves in cycles per second, and $\mu$ is the magnetic permeability of said earth in electromagnetic units, and said selected frequency having a value lying within the frequency range wherein said $i$ and said $T_{11}$ are substantially independent of frequency.

References Cited in the file of this patent

UNITED STATES PATENTS

| | | |
|---|---|---|
| 1,838,371 | Deardorff | Dec. 29, 1931 |
| 1,843,407 | Sundberg | Feb. 2, 1932 |
| 2,139,460 | Potapenko | Dec. 6, 1938 |
| 2,172,688 | Barret | Sept. 12, 1939 |
| 2,573,682 | Barret | Nov. 6, 1951 |